Aug. 13, 1929. S. KELTONIK Re. 17,400

COMBINED INKSTAND AND PENRACK

Original Filed Sept. 2, 1925

Stephen Keltonik Inventor

By C. A. Snow & Co.

Attorneys

Reissued Aug. 13, 1929.

Re. 17,400

UNITED STATES PATENT OFFICE.

STEPHEN KELTONIK, OF CONEMAUGH, PENNSYLVANIA.

COMBINED INKSTAND AND PENRACK.

Original No. 1,668,914, dated May 8, 1928, Serial No. 54,094, filed Setpember 2, 1925. Application for reissue filed June 1, 1929. Serial No. 367,764.

This invention relates to a combined ink stand and pen rack, one of its objects being to provide a means whereby, when a pen is removed from the rack the cover of the inkwell is shifted to open position, the replacing of the pen in the rack resulting in the automatic closing of the inkwell.

A further object is to provide a device of this character which is simple and compact in construction, formed of few parts, and will not readily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings, the preferred form of the invention has been shown.

In said drawings.

Figure 1:
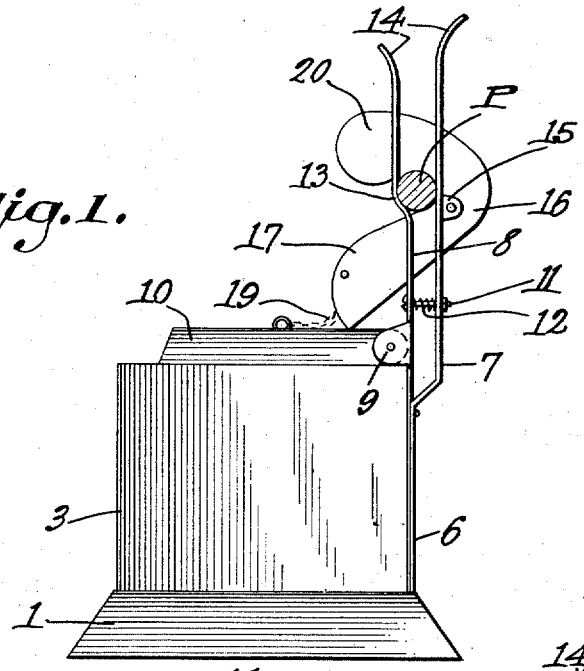
Figure 1 is a side elevation of the device, a penholder being shown in position in the rack.

Referring to the figures by characters of reference 1 designates a base having a recess 2 for the reception of the bottom portion of an inkwell 3. In this base are secured superposed spring strips 4 and 5 having connected upstanding portions 6 extending along the back wall of the inkwell. The upper end portions of these strips are spread apart to provide spaced tongues 7 and 8 and extending from the tongue 8 close to the top of the well 3 are ears 9 between which is pivotally mounted the cover 10 of the inkwell. This cover normally rests upon and closes the inkwell as shown in Figure 1.

The two tongues 7 and 8 are connected, near their lower ends, by a bolt 11 extending loosely through them. On this bolt is mounted a spring 12 the ends of which bear against the respective tongues so as to hold them properly spaced apart. The tongue 8 is offset forwardly at a point between its ends to provide a ledge 13 designed to support a penholder P when inserted downwardly between the tongues. The upper ends of both tongues are curved away from each other as shown at 14 to provide a throat into which a penholder can be inserted readily.

Figure 2:
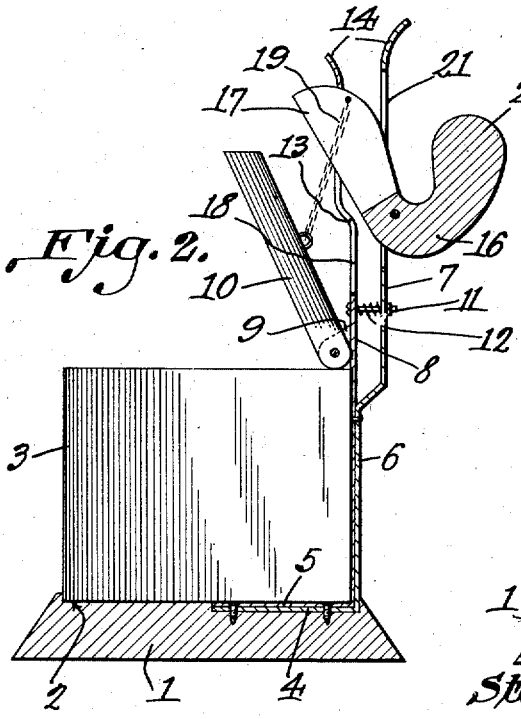
Figure 2 is a view partly in side elevation and partly in section showing the position of the parts when the penholder is removed from the rack.
Figure 3:
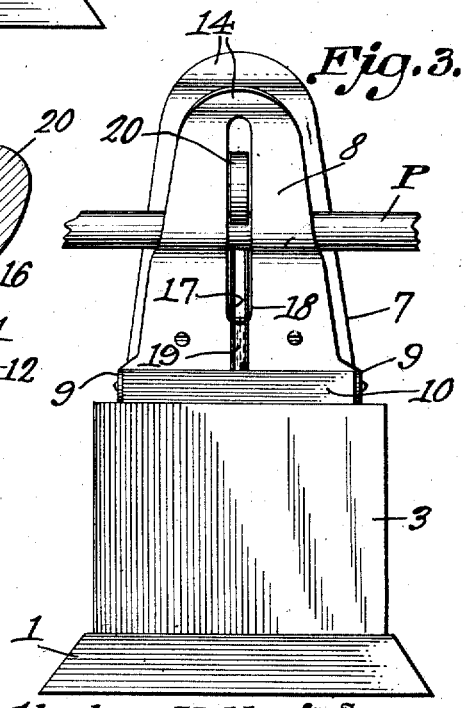
Figure 3 is a front elevation of the structure with the parts in the position shown in Figure 1.

Ears 15 are extended rearwardly from the tongue 7 and pivotally mounted between them is a bell crank 16 which is substantially U-shaped and has its lower arm 17 forked and mounted to swing within a slot 18 provided within the tongue 8. The upward movement of this arm is limited by contact with the upper end wall of the slot 18 while the downward movement thereof is limited by contact with the cover 10 when said cover is closed. A light chain 19 or the like constitutes a connection between this forked arm and the top or lid 10 so that when the arm 17 is swung upwardly it will pull the lid to open position as shown in Figure 2. The upper arm 20 of the bell crank constitutes a weight and is also designed to swing forwardly into the slot 18 and backwardly away from the slot 21 in tongue 7 and in which the bell crank works.

When the bell crank is in the position shown in Figure 2 the weighted arm 20 holds the cover raised and the rounded upper surface of arm 17 is exposed within the space between the two tongues 7 and 8. When a penholder is inserted downwardly between the tongues it will come against this rounded edge of the arm 17 and press the arm downwardly so that the cover 10 will move to closed position. At the same time the weighted arm 20 will be swung forwardly across the space between the tongues so as to overhang the penholder as shown in Figure 1. When it is desired to use the pen the holder is lifted upwardly between the tongues 7 and 8 and will cause the arm 20 to swing backwardly within the slot. This movement is essential in order to lift the penholder from position. Such movement obviously results in opening the inkwell.

What is claimed is:

1. The combination with an inkwell having a hinged cover, of upwardly extending spaced tongues adjacent thereto having straight parallel portions for the reception of a penholder therebetween, one of said tongues being offset to provide a seat for the inserted penholder, superposed integral arms pivotally connected to one of the arms and mounted to swing within the other arm, the upper arm constituting a weight for overhanging a penholder between the tongues to hold the same upon the seat, the other arm normally bearing on the cover to hold it in closed position, said upper arm being liftable by the penholder when raised from between the tongues, thereby to elevate the lower arm, and a flexible connection between the lower arm and the cover for swinging the cover to open position during the completion of the upward swinging movement of the arms under the action of the penholder, said upper arm constituting a weight for movement past the dead center to hold the lower arm and the cover elevated after the withdrawal of the penholder from between the tongues.

2. The combination with an inkwell having a movable cover, of a weight pivotally mounted for free swinging movement, an arm movable by the weight and connected to the cover, and means for guiding a penholder in one direction against the arm to move the weight freely past its dead center thereby to close the cover, and in the opposite direction against the weight to move it past its dead center thereby to raise and support the cover.

3. The combination with an inkwell having a movable cover, of a weight pivotally mounted, an arm movable by the weight and connected to the cover, and spaced means adjacent to the cover for guiding a penholder downwardly against the arm to move the weight freely in one direction past its dead center thereby to close the cover and for guiding a penholder upwardly against the weight to move it freely in the opposite direction past its dead center thereby to raise the cover and support it.

4. The combination with an inkwell having a movable cover, of a weight pivotally mounted, an arm movable by the weight and connected to the cover, and spaced means adjacent to the cover for guiding a penholder downwardly against the arm to move the weight freely in one direction past its dead center thereby to close the cover, and for guiding a penholder upwardly against the weight to move it freely in the opposite direction past its dead center thereby to raise the cover and support it, one of said spaced guiding means constituting a support for the weight and its arm.

In testimony that I claim the foregoing as my own, I have hereto affixed my signature.

STEPHEN KELTONIK.